United States Patent
Rosenzweig et al.

(10) Patent No.: US 8,586,172 B2
(45) Date of Patent: Nov. 19, 2013

(54) PROTECTIVE COATING WITH HIGH ADHESION AND ARTICLES MADE THEREWITH

(75) Inventors: Larry Steven Rosenzweig, Clifton Park, NY (US); James Anthony Ruud, Delmar, NY (US); Luc Stèphane Leblanc, Schenectady, NY (US); Paul Matthew Thomas, Queensbury, NY (US); Scott Sheridan Smith, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1312 days.

(21) Appl. No.: 12/115,819

(22) Filed: May 6, 2008

(65) Prior Publication Data

US 2009/0280298 A1    Nov. 12, 2009

(51) Int. Cl.
- *B32B 3/00* (2006.01)
- *B32B 5/16* (2006.01)
- *C23C 4/04* (2006.01)
- *C23C 4/12* (2006.01)

(52) U.S. Cl.
USPC ..... 428/206; 428/195.1; 428/210; 428/317.9; 428/332; 428/409

(58) Field of Classification Search
USPC ........................................................ 427/448
See application file for complete search history.

(56) References Cited

U.S. PATENT DOCUMENTS

| | | | |
|---|---|---|---|
| 4,880,614 A * | 11/1989 | Strangman et al. | 428/623 |
| 5,558,922 A * | 9/1996 | Gupta et al. | 428/141 |
| 5,830,586 A | 11/1998 | Gray et al. | |
| 6,057,047 A * | 5/2000 | Maloney | 428/623 |
| 6,306,517 B1 | 10/2001 | Gray et al. | |
| 6,703,137 B2 * | 3/2004 | Subramanian | 428/469 |
| 8,192,831 B2 * | 6/2012 | Rosenzweig et al. | 428/161 |
| 8,389,106 B2 * | 3/2013 | Rosenzweig et al. | 428/161 |
| 2004/0229031 A1 | 11/2004 | Gell et al. | |
| 2004/0234687 A1 | 11/2004 | Schmid et al. | |
| 2006/0222777 A1 | 10/2006 | Skoog et al. | |
| 2006/0289405 A1 * | 12/2006 | Oberste-Berghaus et al. | 219/121.47 |
| 2007/0259173 A1 | 11/2007 | Refke et al. | |

OTHER PUBLICATIONS

Racek et al., Nanostructured and convention YSZ coatings deposited using APS and TTPR techniques, Dec. 28, 2005, Elsevier, Surface & Coatings Technology, 201, pp. 338-346.*

Lima et al., Near-isotropic air plasma sprayed titania, 2004 (no month), Elsevier, Acta Materialia, 52, pp. 1163-1170.*

Bhatia et al., Mechanisms of ceramic coating deposition in solution-precursor plasma spray, Sep. 2002, J. Mater. Res., vol. 17, No. 9, pp. 2363-2372.*

(Continued)

*Primary Examiner* — David Sample
*Assistant Examiner* — Jeff Vonch
(74) *Attorney, Agent, or Firm* — Paul J. DiConza

(57) ABSTRACT

Coatings and articles suitable for use in high temperature environments, for example, are presented. One embodiment is a coating that comprises a plurality of elongate material growth domains defined between domain boundaries. The domains have an intra-domain density of at least about 75% of theoretical density, have a substantially equiaxed grain morphology, and comprise a plurality of at least partially melted and solidified particles. Another embodiment is a coating that comprises a matrix comprising a substantially equiaxed grain morphology and a plurality of vertically oriented cracks disposed in the matrix. Further embodiments include articles comprising one or more of the coatings described above.

13 Claims, 2 Drawing Sheets

(56) References Cited

OTHER PUBLICATIONS

Figure 1:
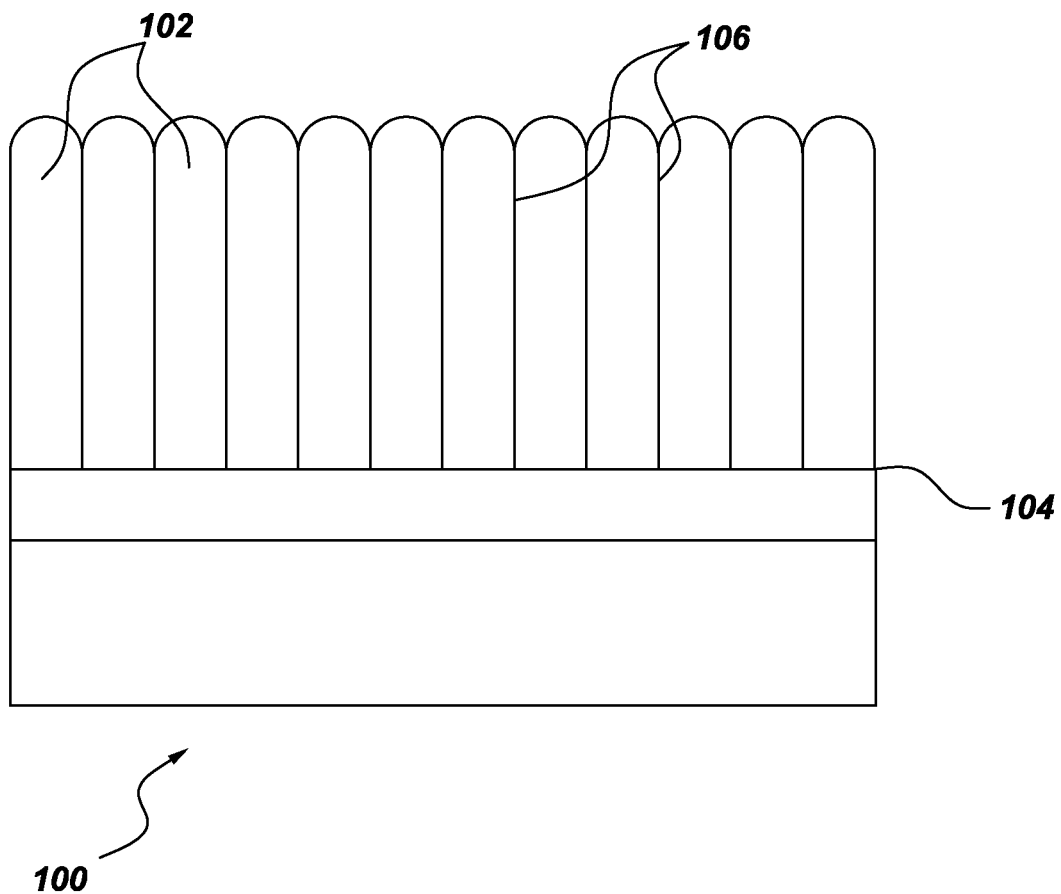

Fauchais et al., Developments in direct current plasma spraying, Jul. 2006, Surface & Coatings Technology 201, pp. 1908-1921.*

Padture et al., Towards Durable Thermal Barrier Coatings With Novel Microstructures Deposited by Solution-Precursor Plasma Spray, 2001 (no month), Acta mater. 49. pp. 2251-2257.*

Xie et al., Formation of vertical cracks in solution-precursor plasma-sprayed thermal barrier coatings, Feb. 2006, Surface & Coatings Technology 201. pp. 1058-1064.*

Chen et al. Tribological properties of nanostructured zirconia coatings deposited by plasma spraying, 2002 (no month), Wear 253, pp. 885-893.*

Delbos et al., Delbos et al Phenomena Involved in Suspension Plasma Spraying Part 2: Zirconia Particle Treatment and Coating Formation, Apr. 2006, Plasma Chem Plasma Process, 26, pp. 393-414.*

Fauchais et al., Operating parameters for suspension and solution plasma spray coatings, Apr. 2008, Surface & Coatings Techology, 202, pp. 4309-4317.*

Bacciochini et al., Porous Architecture of SPS Thick YSZ Coatings Structured at the Nanometer Scale, Jan. 2010, Journal of Thermal Spray Technology, 19, pp. 198-206.*

VanEvery et al., Column Formation in Suspension Plasma-Sprayed Coatings and Resultant Thermal Properties, Jun. 2011, Journal of Thermal Spray Technology, 20, 817-828.*

Tarasi et al., Effective Parameters in Axial Injection Suspension Plasma Spray Process of Alumina-Zirconia Ceramics, Dec. 2008, 17, 685-691.*

Tang et al., Novel Thermal Barrier Coatings Produced by Axial Suspension Plasma Spray, 2011 (no month), Northwest Mettech Corp.*

Kassner et al., "Application of Suspension Plasma Spraying (SPS) for Manufacture of Ceramic Coatings", Journal of Thermal Spray Technology, vol. 17, No. 1, pp. 115-123, Mar. 2008.

Gell et al., "Highly Durable Thermal Barrier Coatings Made by the Solution Precursor Plasma Spray Process", Surface and Coatings Technology, vols. 177-178, pp. 97-102, 2004.

Van Every et al., "Study of Suspension Plasma Sprayed Coatings for Thermal Barrier Applications", 32nd International Conference on Advanced Ceramics and Composites, Daytona Beach, 29 pages, Jan. 27-Feb. 1, 2008.

Refke et al., "LPPS Thin Film Technology for the Application of TBC Systems", International Thermal Spray Conference, Conference, Basel, Switzerland, 6 pages (plus cover sheet), May 2-4, 2005.

Refke et al., "LPPS Thin Film: A Hybrid Coating Technology Between Thermal Spray and PVD for Functional Thin Coatings and Large Area Applications", Proceedings of the 2007 International Thermal Spray Conference, Bejing, China, pp. 705-710, May 14-17, 2007.

J. O. Berghaus et al., "Suspension Plasma Spraying of Nanostructured WC-12Co Coatings," Journal of Thermal Spray Technology, vol. 15, No. 4, Dec. 2006, pp. 676-681.

J. O. Berghaus et al., "Suspension Plasma Spraying of Nano-Ceramics Using an Axial Injection Torch," Proceedings Thermal Spray 2005, pp. 1434-1440.

W.A. Nelson et al., "TBC Experience in Land-Based Gas Turbines," journal of Thermal Spray Technology, vol. 6, No. 2, Jun. 1997, pp. 176-180.

S. Bouaricha et al, "Production of Samarium Doped-Ceria Plasma Sprayed Nano-Coating using an Internal Injection of a Suspension Containing Nanoparticles," Proceeding Thermal Spray 2005, pp. 486-492.

J. Will et al., "Electrophoretic Deposition of Zirconia on Porous Anodic Substrates," Journal of the American Ceramic Society, vol. 84, No. 3, 2001, pp. 328-332.

J. O. Berghaus et al., "Mechanical and Thermal Transport Properties of Suspension Thermal-Sprayed Alumina-Zirconia Composite Coatings," Journal of Thermal Spray Technology, vol. 17, No. 1, Mar. 2008, pp. 91-104.

E. H. Jordan et al., "Superior Thermal Barrier Coatings Using Solution Precursor Plasma Spray," Journal of Thermal Spray Technology, vol. 13, No. 1, Mar. 2004, pp. 57-65.

J. O. Berghaus et al., "Axial Injection Suspension Thermal Spraying of Functional Coatings and Devices," Industrial Materials Institute, 2008, 31 pages.

J. Fazilleaut al., "Phenomena Involved in Suspension Plasma Spraying Part 1: Suspension Injection and Behavior," Plasma Chemical Plasma Processing, vol. 26, 2006, pp. 371-391.

C. Delbos et al., "Phenomena Involved in Suspension Plasma Spraying Part 2: Zirconia Particle Treatment and Coating Formation," Plasma Chemical Plasma Processing, vol. 26, 2006, pp. 393-414.

J. Berghaus et al., "Injection Conditions and In-Flight Particle States in Suspension Plasma Spraying of Alumina and Zirconia Nano-Ceramics," Thermal Spray Connects: Explore its Surface Potential, International Thermal Spray Conference, 2005, 7 pages.

* cited by examiner

PROTECTIVE COATING WITH HIGH ADHESION AND ARTICLES MADE THEREWITH

BACKGROUND

This invention relates to coatings for high temperature applications, such as gas turbine assemblies.

The design of modern gas turbines is driven by the demand for higher turbine efficiency. It is widely recognized that turbine efficiency can be increased by operating the turbine at higher temperatures. In order to assure a satisfactory life span at these higher temperatures, thermal barrier coatings (hereinafter referred to as "TBCs") are applied to airfoils and combustion components of the turbine, such as transition pieces and combustion liners, using various techniques.

One important aspect of TBC's is their ability to tolerate strain in the underlying component without becoming detached from the component. Because TBC's are typically made of ceramic materials having much lower inherent ductility than their underlying metallic components, various microstructural features are typically incorporated into the TBC to provide it with improved strain tolerance. For instance, TBC's deposited by plasma spray processes typically incorporate significant porosity, vertical microcracks, or combinations thereof as a means to enhance the ability of the TBC to tolerate strain. TBC's deposited by vapor processes, such as physical vapor deposition (PVD), typically are fabricated under conditions that encourage nucleation and growth of discrete, tightly packed, columnar grains, which provides a compliant microstructure with a relatively high degree of strain tolerance.

Although PVD processes provide coatings with very attractive strain tolerance properties, they tend to be relatively expensive and applicable to relatively small components when compared with plasma spray processes, because PVD processes require a vacuum chamber and supporting equipment. On the other hand, traditional thermal spray processes tend to produce coatings with lower strain tolerance and substrate adhesion than PVD processes, and generally require ancillary surface preparation processes, such as grit blasting and deposition of rough bond coats, to provide adequate adhesion to the underlying component.

Therefore, there is a need for coatings with high strain tolerance, high adhesion, and reduced need for surface preparation processes, that can be applied via comparatively inexpensive and scalable processes such as plasma spray processes.

BRIEF DESCRIPTION

Embodiments of the present invention are provided to meet this and other needs. One embodiment is a coating that comprises a plurality of elongate material growth domains defined between domain boundaries. The domains have an intra-domain density of at least about 75% of theoretical density, have a substantially equiaxed grain morphology, and comprise a plurality of at least partially melted and solidified particles.

Another embodiment is a coating that comprises a matrix comprising a substantially equiaxed grain morphology; and a plurality of vertically oriented cracks disposed in the matrix.

Further embodiments include articles comprising one or more of the coatings described above.

DRAWINGS

Figure 2:
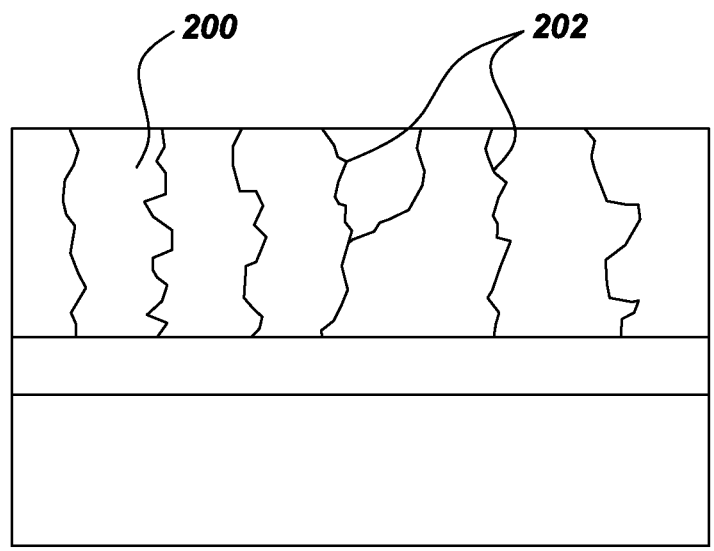
Figure 3:
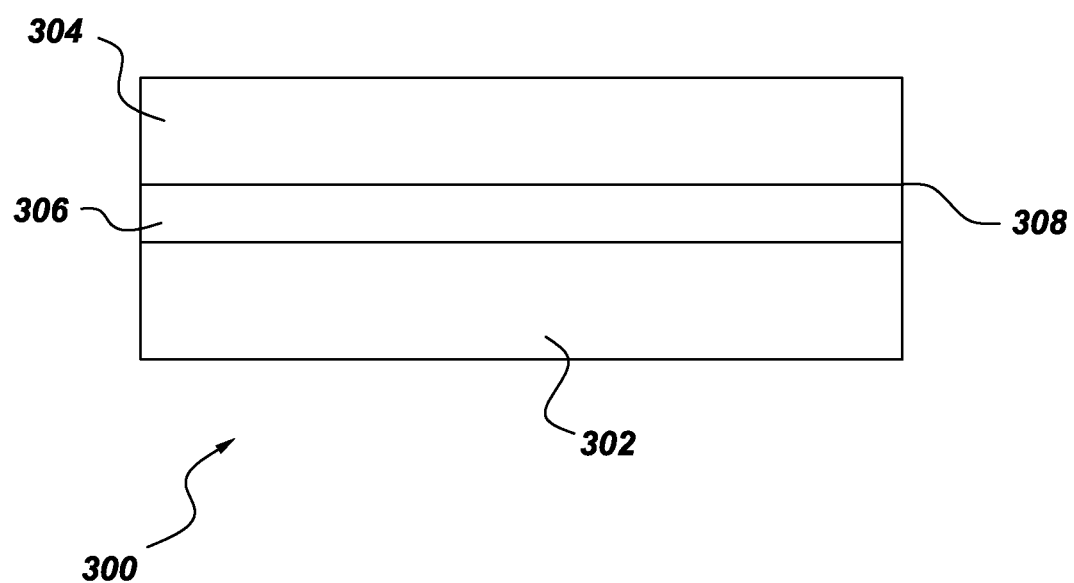

These and other features, aspects, and advantages of the present invention will become better understood when the following detailed description is read with reference to the accompanying drawings in which like characters represent like parts throughout the drawings, wherein:

FIGS. 1-3 are schematic cross-sections of exemplary embodiments of the present invention.

DETAILED DESCRIPTION

Embodiments of the present invention include a coating having a unique microstructure that provides adhesion and strain tolerance approaching that of PVD-deposited coatings, but that is deposited by comparatively inexpensive air plasma spray techniques.

In one embodiment, as depicted schematically in FIG. 1, the coating 100 comprises a plurality of elongate material growth domains 102. As used herein, the term "elongate" refers to a structure having an aspect ratio of greater than 1. The growth domains 102 are generally vertically oriented, meaning that their longest axes are substantially normal to a coating interface 104. In accordance with embodiments of the present invention, as material is deposited to form coating 100, the material accumulates in domains 102 defined as regions of comparatively high density separated by domain boundaries 106 of comparatively low (though not necessarily zero) density. Boundaries 106 may, in some embodiments, extend for a length equal to at least about 50% of the coating thickness, and this length may be at least about 75% of the thickness in certain embodiments. Generally, the strain tolerance of coating 100 is enhanced by the presence of longer, well-defined boundaries 106.

The density of material contained within domains 102, also referred to herein as "intra-domain density," is at least about 75% of theoretical density. In some embodiments, this density is even higher, such as greater than 85% and, in certain embodiments, greater than 95%. A high intra-domain density may provide desirable resistance to erosion and may enhance cohesive strength of coating 100.

The presence of domain boundaries 106 may provide desirable compliance and strain tolerance properties for coating 100. A coating with narrower domains has a greater density of domain boundaries. The width of the domain can be in the range from about 20 micrometers to about 100 micrometers, in some embodiments; in certain embodiments this width is in the range from about 30 micrometers to about 90 micrometers, and in particular embodiments the width is from about 40 micrometers to about 80 micrometers. Domain width as used herein is measured based on the average number of boundaries respectively intercepted by lines of known length drawn along a cross section of the coating at 33% of the coating thickness and at 67% of the coating thickness; mean domain width is simply the known length divided by the number of intercepted boundaries. In certain embodiments, at least about 50% by volume of the coating contains domains 102; thus it is not necessary that the entire coating 100 comprise the structure described herein. In some embodiments, however, the advantages provided by this unique structure are such that substantially all of the coating 100 comprises the described structure.

Without being bound by any particular theory, certain characteristics of domains 102 indicate that the deposition mechanism for coating 100 is substantially by accumulation of pre-condensed matter at a growth surface; in this instance "pre-condensed matter" refers to solid and/or liquid matter that impinges upon a growth surface, rather than matter that condenses at the growth surface from the vapor phase. For example, domains 102 comprise a plurality of at least partially melted and solidified particles (meaning the particles were at least partially liquid before impinging the surface and finally fully solidifying), which are often (though not always) discernable as "prior particles" in the microstructure of coating 100 via microscopy techniques. In certain embodiments, at least 50% of the material present in domains 102 comprises at least partially melted and solidified particles; in particular embodiments this amount is at least about 80%, and in more particular embodiments substantially all of the material in domains 102 is made of at least partially melted and solidified particles. Moreover, in some embodiments, domains 102 generally lack substantial crystallographic texture, in stark contrast to coatings deposited via a vapor deposition mechanism. Instead, domains 102 typically have a substantially isotropic crystallographic orientation. In this context, a "substantially isotropic crystallographic orientation" means that the material in question has a texture coefficient in the range from about 0.75 to about 1.25, as that coefficient is defined in D. S. Rickerby, A. M. Jones and B. A. Bellamy, *Surface and Coatings Technology*, 37, 111-137 (1989).

Conventional thermal barrier coatings include the so-called "dense vertically cracked" coatings, which are characterized in part by a lamellar microstructure that includes elongate grains readily indicative of directional solidification to those skilled in the art. See, for example, U.S. Pat. No. 6,306,517. The elongate grains within the lamellae tend to have a preferred orientation perpendicular to the lamella boundaries, and they typically have aspect ratios greater than about 4:1 and often as high as 10:1. In contrast to dense vertically cracked coatings, coating 100 of the present invention is generally characterized by randomly oriented, substantially equiaxed grains contained within domains 102, and by the absence of distinct lamellar features. In this context, "substantially equiaxed" means the population of grains in coating 100 has a median aspect ratio of less than about 3:1. Moreover, "randomly oriented" refers to the general lack of a preferred orientation such that long axes of grains (if such a long axis is present) are not as a whole oriented with respect to a spray direction or solidification direction. Note that this use of the term "orientation" referring to the placement of a grain in space should not be confused with crystallographic orientation, or "texture" of a material.

In certain embodiments, coating 100 is a thermal barrier coating. In some embodiments, coating 100 comprises a ceramic material, such as an oxide. Particular examples of thermal barrier coatings include stabilized zirconia, such as yttria-stabilized zirconia; zirconates; and other oxides, such as hafnates and cerates, and including oxides that may be stabilized with yttria or other stabilizing agents, such as ceria.

In another embodiment, referring to FIG. 2, the coating 200 more closely resembles a dense vertically cracked coating, in that it comprises a plurality of vertically oriented cracks 202 to provide strain tolerance. However, unlike conventional dense vertically cracked coatings, coating 200 comprises a matrix in which cracks 202 are disposed, where the matrix comprises a substantially equiaxed (as this term is defined above in the discussion of coating 100) grain morphology. In some embodiments the grains in the matrix are randomly oriented, as that term has been used above. This lack of preferred grain orientation, as noted previously, further distinguishes coating 200 from conventionally fabricated dense vertically cracked coatings. Cracks 202 are typically present in the matrix at a level greater than about 250 cracks per inch (about 100 cracks per centimeter); in some embodiments, this level is greater than about 300 cracks per inch (about 120 cracks per centimeter). The number and length of cracks 202 generally affect the strain tolerance of the coating. In some embodiments, the cracks 202 extend at least about 50% of the coating thickness, and in certain embodiments the crack length is at least about 75% of the coating thickness. Crack length in this context is defined as the median length measured for the crack population of coating 200. Coating 200 is generally characterized by a relatively high "intracrack" density (that is, the density of the coating exclusive of cracks), which in some embodiments is at least about 90% of theoretical density, and in particular embodiments is at least about 95% of theoretical density. Materials suitable for use in coating 100 are also suitable for coating 200.

Further embodiments of the present invention include articles comprising either of the coatings 100, 200 described above. Referring to FIG. 3, article 300 comprises a substrate 302 and a coating 304 disposed on substrate 302. Coating 304 comprises coating 100 or coating 200 as described above. Substrate 302 may be any suitable support material, but in particular embodiments comprises a high temperature alloy, such as a nickel-based or cobalt-based superalloy.

In some embodiments, article 300 further comprises a bondcoat 306 disposed between coating 304 and substrate 302. Bondcoats, such as MCrAlY or aluminide coatings, are commonly used in thermal barrier coating systems to provide oxidation resistance to the substrate and to enhance adhesion of ceramic topcoats. In fact, air plasma sprayed bondcoats as commonly used in the art are often deposited with intentionally rough surfaces to enhance mechanical interlocking with subsequently deposited ceramic topcoats. In stark contrast to these conventional coating systems, coating 300 of the present invention may exhibit very high adhesion strength, even to comparatively smooth surfaces. In some embodiments, bondcoat 306 has a surface roughness on a deposition surface 308 of less than about 150 microinches $R_a$. In some embodiments, this roughness is even lower, such as less than 100 microinches $R_a$ and, in certain embodiments, less than about 75 microinches $R_a$. Even at such reduced bondcoat roughness values, the adhesion strength of coating 300 is unexpectedly high. In some embodiments, this adhesion strength is greater than about 7 megapascals (MPa), and in certain embodiments this strength is greater than about 28 MPa. Adhesion strengths as referred to herein refer to values measured in accordance with the procedure set forth in ASTM Standard C633.

The advantages described above for coating 100, 200 make them suitable for use in elevated temperature applications. Accordingly, in some embodiments, article 300 comprises a component of a gas turbine assembly, including, for instance, a gas turbine assembly for power generation or for propulsion of a ship, aircraft, or other craft. Exemplary components include turbine blades, stator vanes, and combustion components.

Coatings of the present invention owe their remarkable structures and properties at least in part to the processing used in their fabrication. The process involves air plasma spraying, which, as discussed above, provides certain economic and manufacturing advantages over processes that require the use of vacuum equipment, such as PVD or vacuum plasma spray deposition. In particular, the process uses a feedstock comprising fine particles suspended in a liquid agent that is fed to a plasma spray torch in a controlled manner and injected into the plasma plume for deposition onto a substrate. The particles have a median diameter typically, but not necessarily, in the range from about 0.4 micrometers to about 2 micrometers.

Those skilled in the art will appreciate that many different processing parameters are available for adjustment in a given air plasma spray process, and that various combinations of these parameters may result in coatings with different structures and properties.

Kassner et al. (*J. Thermal Spray Technol.* v17, 115-123 (2008)) have produced coatings from suspensions of submicron yttria stabilized zirconia (YSZ) powders using plasma spray guns rated at powers between about 25-60 kW. Using 0.3 micrometer particles, they have observed lamellar coating microstructures with anisotropic grains. Using 25 nm particles, they have produced porous vertically cracked coatings with crack densities up to 180 cracks per inch (7 cracks/mm). They report high vertical crack counts with lower density than traditional thermal spray processes for thermal conductivity improvements. This process is distinct from embodiments of the present invention, in which high density, highly cracked coatings with equiaxed grain morphologies are described using significantly higher power thermal spray processes (see the examples, below).

Kassner, et al. also describe using 25 nm YSZ particles and a 60 kW-rated plasma spray gun to produce highly porous columnar microstructures with up to 70% open porosity. They describe the potential application of such structures for catalytic processes utilizing high specific surface area. In stark contrast, the coatings of the present invention include high-density elongate growth domains with the required mechanical properties for durable thermal barrier coatings.

Gell, et al., in *Surf. Coating Technol.* v177-178, 97 (2004), and in US Patent Application Publication 2004/0229031, have produced stabilized zirconia coatings from a solution precursor with a 35-45 kW plasma gun. Splat-like microstructures with columnar grains are observed in the coatings, which have 15-40% porosity and vertical crack densities up to about 250 cracks/in (average crack spacing of 100 micrometers). Those coatings are distinct from embodiments of the present invention, which include coatings with highly dense, equiaxed grain structures.

The following examples are presented to further describe the fabrication of coatings of the present invention, but should not be read as limiting, because variations still within the scope of embodiments of the present invention will be apparent to those skilled in the art.

Example 1

An yttria-stabilized-zirconia (YSZ) coating was produced on an Alloy 718 plate using a DC plasma gun. The feedstock material was 8 wt % YSZ powder with a median particle diameter ($d_{50}$) of 0.4 micrometers suspended in ethanol at 10 percent by weight, using polyethyleneimine as a dispersant (at 0.2 percent by weight of the solids). The suspension was injected at a feed rate of about 0.25 pounds (about 113 grams) of YSZ per hour into a Northwest Mettech Axial III torch through the center tube of a tube-in-tube atomizing injector with a nitrogen atomizing gas flowing through the outer tube. The total torch power was about 120 kW, with a current of about 200 amperes maintained for each of the three torch electrodes, and a total gas flow of 245 liters per minute that consisted of a mixture of 30% argon, 55% nitrogen, and 15% hydrogen. The plasma torch was rastered across the substrate at 600 millimeters (mm) per second while maintaining a constant spray distance of 76 mm distance between the torch nozzle and substrate. A coating thickness of approximately 165 micrometers was obtained.

The resultant coating comprised the structure illustrated in FIG. 1, with a plurality of elongate material growth domains. The intra-domain density and average domain width were measured from cross-sectional images of polished surfaces. The area fraction of solid phases was determined at a magnification of 400× from the contrast in light microscopy to be about 95.5%. The average domain width was determined from the average linear intercept to be about 41 micrometers.

The grain morphology was evaluated from scanning electron microscopy images of coating fracture surfaces. The aspect ratios were measured for a random sampling of the grains. The median aspect ratio was 1.7:1, indicating a substantially equiaxed grain morphology.

Example 2

YSZ coatings were produced on substrates of Rene N5 with a platinum nickel aluminide diffusion bondcoat. The bondcoat surface was prepared by grit blasting with 80 grit size aluminum oxide at 40 psi pressure. The average Ra roughness of the substrate surface was about 50 microinches. Coatings were sprayed with the same coating parameters as for Example 1. The coatings were about 228 micrometers thick. The tensile adhesion strength was measured using the ASTM C633 specification. The average adhesion strength was 55.6+/−11.6 MPa.

Example 3

A YSZ coating was produced on a 304 stainless steel plate grit blasted with 60 grit aluminum oxide at 50 psi pressure. The coating was produced using the same parameters as described in Example 1, except that the torch to substrate spray distance was 50 mm instead of 76 mm (which was used for examples 1 and 2).

The resultant coating comprised the structure illustrated in FIG. 2, with a matrix comprising a randomly oriented, substantially equiaxed grain morphology; and a plurality of vertically oriented cracks disposed in the matrix. The intracrack density and vertical crack density were measured from cross-sectional images of polished surfaces. The area fraction of solid phases was determined at a magnification of 400× from the contrast in light microscopy to be about 99%. The linear density of vertical cracks that extended at least 50% through the thickness was 560 cracks per inch and the density that extended at least 75% through the thickness was 340 cracks per inch.

The grain morphology was evaluated from scanning electron microscopy (SEM) images of coating fracture surfaces. The aspect ratios were measured for a random sampling of the grains using an image analysis technique. The median aspect ratio was 2:1, indicating a substantially equiaxed grain morphology. There was a lack of distinct lamellar features and very few individual lamellar regions were evident.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An article for use at elevated temperatures, comprising:
a substrate; and
a coating disposed on the substrate,
wherein the coating as viewed in cross-section comprises a plurality of elongate, generally vertically oriented material preferential growth domains defined between domain boundaries, the domains (1) having an intra-domain density of at least about 75%, (2) having a substantially equiaxed grain morphology, and (3) comprising a plurality of prior particles discernible via microscopy.

2. The article of claim 1, wherein the domains have a width in the range from about 20 micrometers to about 100 micrometers.

3. The article of claim 1, wherein the domains have a substantially isotropic crystallographic orientation.

4. The article of claim 1, wherein the intra-domain density is at least about 85%.

5. The article of claim 1, wherein at least about 50% by volume of the coating comprises the elongate material growth domains.

6. The article of claim 1, wherein the coating comprises a ceramic material.

7. The article of claim 1, wherein the coating comprises an oxide.

8. The article of claim 1, wherein the coating comprises a material selected from the group consisting of stabilized zirconia, zirconates, and stabilized oxides.

9. The article of claim 1, further comprising a bondcoat disposed between the substrate and the coating.

10. The article of claim 9, wherein the bondcoat has a surface roughness of less than about 150 microinches $R_a$.

11. The article of claim 10, wherein an adhesion strength of the coating to the article is greater than about 7 megapascals.

12. The article of claim 11, wherein the adhesion strength is greater than about 28 megapascals.

13. The article of claim 1, wherein the article comprises a component of a gas turbine assembly.

\* \* \* \* \*